United States Patent
Toullec et al.

(10) Patent No.: US 11,716,503 B2
(45) Date of Patent: Aug. 1, 2023

(54) METHOD FOR MANAGING MULTIMEDIA CONTENT, AND DEVICE FOR CARRYING OUT SAID METHOD

(71) Applicants: ATEME, Velizy Villacoublay (FR); INSTITUT MINES TELECOM, Palaiseau (FR)

(72) Inventors: Eric Toullec, Rennes (FR); Lucas Gregory, Rennes (FR); Jean Le Feuvre, Gometz le Chatel (FR)

(73) Assignees: ATEME, Velizy Villacoublay (FR); INSTITUT MINES TELECOM, Palaiseau (FR)

( * ) Notice: Subject to any disclaimer, the term of this patent is extended or adjusted under 35 U.S.C. 154(b) by 0 days.

(21) Appl. No.: 17/440,337

(22) PCT Filed: Mar. 17, 2020

(86) PCT No.: PCT/FR2020/050578
§ 371 (c)(1),
(2) Date: Sep. 17, 2021

(87) PCT Pub. No.: WO2020/188218
PCT Pub. Date: Sep. 24, 2020

(65) Prior Publication Data
US 2022/0191586 A1 Jun. 16, 2022

(30) Foreign Application Priority Data

Mar. 18, 2019 (FR) ...................................... 19 02771

(51) Int. Cl.
*H04N 21/44* (2011.01)
*H04N 21/43* (2011.01)
(Continued)

(52) U.S. Cl.
CPC . *H04N 21/44016* (2013.01); *H04N 21/23439* (2013.01); *H04N 21/43079* (2020.08); *H04N 21/84* (2013.01); *H04N 21/8456* (2013.01)

(58) Field of Classification Search
CPC ....... H04N 21/44016; H04N 21/23439; H04N 21/43079; H04N 21/84; H04N 21/8456;
(Continued)

(56) References Cited

U.S. PATENT DOCUMENTS

2013/0159421 A1\* 1/2013 Yue ........................ H04L 45/60
2015/0269629 A1 9/2015 Lo et al.
(Continued)

OTHER PUBLICATIONS

Stockhammer et al., Systems subgroup, "Technologies under Consideration for Dynamic Adaptive Streaming over HTTP 23009, Parts 1, 3, 4, 5 and 6," International Organzation for Standadisation ISO/IEC JTC1/SC29/WG11 Coding of Moving Pictures and Audio, ISO/IEC JTC1/SC29/WG11, MPEG2018/N17812, Jul. 2018, Ljubljana, Slovenia, 115 pages.
(Continued)

*Primary Examiner* — Anthony Bantamoi
(74) *Attorney, Agent, or Firm* — Nixon & Vanderhye

(57) ABSTRACT

A method for managing multimedia contents is proposed, which method comprises: obtaining a first set of multimedia-content description metadata describing a first multimedia content delivered in dynamic mode; on reading, from the first set of metadata, a splice indicator indicating a splice to a second set of multimedia-content description metadata, reading, from the first set of metadata, an address storage indicator; and storing, in a memory, an address of the first set of metadata.

20 Claims, 8 Drawing Sheets

(51) Int. Cl.
*H04N 21/2343* (2011.01)
*H04N 21/84* (2011.01)
*H04N 21/845* (2011.01)

(58) Field of Classification Search
CPC .............. H04N 21/4331; H04N 21/812; H04N 21/26258
See application file for complete search history.

(56) References Cited

U.S. PATENT DOCUMENTS

2019/0104316 A1* 4/2019 Da Silva Pratas Gabriel ............. H04N 21/234345
2020/0053430 A1* 2/2020 Burke .............. H04N 21/47217

OTHER PUBLICATIONS

Sodagar, "[CAPCO] Proposal: MPD chaining for Prerolls," International Organzation for Standadisation ISO/IEC JTC1/SC29/WG11, Coding of Moving Pictures and Audio, ISO/IEC JTC1/SC29/WG11 MPEG2015/m37083, Nov. 2015, Geneva, Switzerland, 15 pages.

Qualcomm Incorporated, "eDASH: Server-based Ad Insertion based on DASH-IF," S4-150416, 3GPP TSG SA4#83 meeting, Bratislava, Solvakia, Apr. 13-17, 2015, 14 pages.

International Search Report for PCT/FR2020/050578 dated Jun. 23, 2020, 6 pages.

Written Opinion of the ISA for PCT/FR2020/050578 dated Jun. 23, 2020, 7 pages.

[Online] Technologies under Consideration for DASH, No. n17812, Jul. 20, 2019, MPEG Meeting—submission pending.

I. Sodagar, "[CAPCO] Proposal: MPD chaining for pre/mid rolls", 113, No. m37084, Oct. 14, 2015, MPEG Meeting—submission pending.

[Online] Qualcomm Incorporated. "eDASH: Server-based Ad Insertion based on DASH-IF", vol. SA WG4, No. Bratislava, Solvakia, Apr. 15, 2015, 3GPP Draft,—submission pending.

* cited by examiner

```
<?xml version="1.0" encoding="UTF-8"?>
<MPD
  availabilityStartTime="2019-01-28T08:37:57Z"
  maxSegmentDuration="PT2S"
  minBufferTime="PT2S"
  minimumUpdatePeriod="PT10S"
  profiles="urn:mpeg:dash:profile:isoff-live:2011"
  publishTime="2019-01-28T08:37:57Z"
  timeShiftBufferDepth="PT20S"
  type="dynamic"
  xmlns="urn:mpeg:dash:schema:mpd:2011"
  xmlns:cenc="urn:mpeg:cenc:2013"
  xmlns:xsi="http://www.w3.org/2001/XMLSchema-instance"
  xsi:schemalocation="urn:mpeg:dash:schema:mpd:2011 DASH-MPD.xsd">
   <Period id="P0" start="PT0S">
      <AdaptationSet contentType="video" id="0" maxFrameRate="25" maxHeight="1080"
maxWidth="1920" mimeType="video/mp4" minFrameRate="25" minHeight="1080"
minWidth="1920" par="16:9" segmentAlignment="true" startWithSAP="1">
         <Role schemeIdUri="urn:mpeg:dash:role:2011" value="main"/>
         <Representation bandwidth="4000000" codecs="hev1.2.4.L120.90"
frameRate="25" height="1080" id="v1" sar="1:1" width="1920">
            <SegmentTemplate duration="2000000" initialization="$RepresentationID$-
init.mp4" media="$RepresentationID$-$Number$.m4s" startNumber="1"
timescale="1000000"/>
         </Representation>
      </AdaptationSet>
      <AdaptationSet contentType="audio" id="1" lang="und" mimeType="audio/mp4"
segmentAlignment="true" startWithSAP="1">
         <Role schemeIdUri="urn:mpeg:dash:role:2011" value="main"/>
         <Representation audioSamplingRate="48000" bandwidth="128000"
codecs="mp4a.40.2" id="a2">
            <AudioChannelConfiguration
schemeIdUri="urn:mpeg:dash:23003:3:audio_channel_configuration:2011" value="2"/>
            <SegmentTemplate duration="2000000" initialization="$RepresentationID$-
init.mp4" media="$RepresentationID$-$Number$.m4s" startNumber="1"
timescale="1000000"/>
         </Representation>
      </AdaptationSet>
   </Period>
</MPD>
```

FIG. 2A

```
<?xml version="1.0" encoding="UTF-8"?>
<MPD
  type="dynamic"
  availabilityStartTime="2019-01-28T04:00:00Z"
  publishTime="2019-01-28T04:00:00Z"
  minimumUpdatePeriod="PT10S"
  minBufferTime="PT2S"
  timeShiftBufferDepth="PT20S"
  UTCTiming=" urn:mpeg:dash:utc:http-ntp:2014"
  maxSegmentDuration="PT2S"
  profiles="urn:mpeg:dash:profile:isoff-live:2011"
  xmlns="urn:mpeg:dash:schema:mpd:2011"
  xmlns:cenc="urn:mpeg:cenc:2013"
  xmlns:xsi="http://www.w3.org/2001/XMLSchema-instance"
  xsi:schemalocation="urn:mpeg:dash:schema:mpd:2011 DASH-MPD.xsd">
    <Period id="P0" start="PT0S">
        <AdaptationSet id="0" contentType="video" ...>
        </AdaptationSet>
        <AdaptationSet id="1" contentType="audio" ...>
        </AdaptationSet>
    </Period>
    <SupplementalProperty schemeIdUri="urn:mpeg:dash:chaining:2016"
value="http://.../live2/manifest.mpd" />
  </MPD>
```

```
<?xml version="1.0" encoding="UTF-8"?>
<MPD
  type="dynamic"
  availabilityStartTime="2019-01-28T04:00:00Z"
  publishTime="2019-01-28T04:00:00Z"
  minimumUpdatePeriod="PT10S"
  minBufferTime="PT2S"
  timeShiftBufferDepth="PT20S"
  UTCTiming=" urn:mpeg:dash:utc:http-ntp:2014"
  maxSegmentDuration="PT2S"
  profiles="urn:mpeg:dash:profile:isoff-live:2011"
  xmlns="urn:mpeg:dash:schema:mpd:2011"
  xmlns:cenc="urn:mpeg:cenc:2013"
  xmlns:xsi="http://www.w3.org/2001/XMLSchema-instance"
  xsi:schemalocation="urn:mpeg:dash:schema:mpd:2011 DASH-MPD.xsd">
   <Period id="P0" start="PT0S">
      <AdaptationSet id="0" contentType="video" ...>
      </AdaptationSet>
      <AdaptationSet id="1" contentType="audio" ...>
      </AdaptationSet>
   </Period>
   <SupplementalProperty schemeIdUri="urn:mpeg:dash:chaining:2016"
value="http://.../live2/manifest.mpd" />
   <SupplementalProperty schemeIdUri="urn:mpeg:dash:origin-set:2019" />
</MPD>
```

FIG. 6A

```
<?xml version="1.0" encoding="UTF-8"?>
<MPD
  type="dynamic"
  availabilityStartTime="2019-01-28T14:00:00Z "
  publishTime="2019-03-01T14:00:00Z "
  minimumUpdatePeriod="PT10S"
  minBufferTime="PT2S"
  timeShiftBufferDepth="PT10S"
  UTCTiming=" urn:mpeg:dash:utc:http-ntp:2014"
  maxSegmentDuration="PT2S"
  profiles="urn:mpeg:dash:profile:isoff-live:2011"
  xmlns="urn:mpeg:dash:schema:mpd:2011"
  xmlns:cenc="urn:mpeg:cenc:2013"
  xmlns:xsi="http://www.w3.org/2001/XMLSchema-instance"
  xsi:schemalocation="urn:mpeg:dash:schema:mpd:2011 DASH-MPD.xsd">
   <Period id="P100" start="PT0S">
      <AdaptationSet id="0" contentType="video" ...>
      </AdaptationSet>
      <AdaptationSet id="1" contentType="audio" ...>
      </AdaptationSet>
   </Period>
   <SupplementalProperty schemeIdUri="urn:mpeg:dash:origin-back:2019" />
</MPD>
```

FIG. 6B

METHOD FOR MANAGING MULTIMEDIA CONTENT, AND DEVICE FOR CARRYING OUT SAID METHOD

This application is the U.S. national phase of International Application No. PCT/FR2020/050578 filed Mar. 17, 2020 which designated the U.S. and claims priority to FR Patent Application No. 1902771 filed Mar. 18, 2019, the entire contents of each of which are hereby incorporated by reference.

FIELD AND CONTEXT OF THE INVENTION

The present invention relates to the field of the delivery of data over a telecommunications network. In particular, it relates to delivery of multimedia content (audio and/or video, subtitles, data, etc.) and especially to delivery in real time.

The world of delivery or broadcast of digital television has undergone real changes in recent years. To conventional delivery carried out in dynamic mode via pay-TV operators (e.g. satellite TV and/or Internet service providers (ISPs)) as regards so-called linear television (ADSL (standing for asymmetric digital subscriber line), satellite, cable, IPTV, fiber, digital terrestrial television (DTT), etc.), have been added new audiovisual services such as video on demand (VOD), or catch-up TV (or replay).

The design of new terminals that are ever more powerful and more mobile, the growing demand for consumption of content independent of the location of the consumer (TV everywhere), as well as the development of network infrastructures offering ever more bandwidth, have led to the emergence of a new market that does not require the access network used by users to be possessed, this market being called the over-the-top (OTT) market. The OTT market operates on so-called unmanaged networks (i.e. with bandwidth and quality of service (QoS) not guaranteed). These multi-screen OTT services are provided by broadcasters/rebroadcasters, i.e. television broadcasters and telecom operators.

The infrastructure used for content delivery has thus at the present time been doubled up, there being one set of infrastructure for traditional broadcasting and (at least) one set of infrastructure for OTT delivery.

In order to address multi-screen content delivery services, various protocols have been developed: Apple HLS (HTTP Live Streaming), Microsoft Smooth Streaming (MSS), Adobe HTTP Dynamic Streaming (HDS), MPEG Dynamic Adaptive Streaming over HTTP (MPEG-DASH). All these protocols are based on the concept of http adaptive streaming (HAS).

Multi-screen content delivery typically uses a video delivery network head end comprising a video encoding unit that receives content to be encoded as input and delivers to a packager encoded streams known as "elementary streams". Content received as input is encoded according to a plurality of encoding profiles (a profile being for example defined with codec, resolution and bit-rate parameters).

The encoded streams (elementary streams) delivered by the video encoding unit are split within the packager into at least two sequences, audio and video sequences respectively, of successive segments, the segments generally being of set duration (typically a few seconds) and of format dependent on the chosen protocol (for example MPEG2-TS, MP4, etc.). For each content, a set of metadata relative to multimedia contents, which is sometimes called a media presentation description (MPD) or manifest, or indeed a container, is also generated by the packager, for example in the form of a file, for example in XML format, indicating the characteristics of each profile and the available segments corresponding to the content.

These manifests and the associated segments are supplied by the packager to a content server, then stored on content delivery networks (CDNs), these providing cache capacities that make it possible to improve quality of service, and to minimize access times and the latency with which content may be viewed by player terminals.

A terminal for playing video content delivered in dynamic mode (for example a terminal configured within a user device such as a smartphone, tablet or any other type of computer), or in other words dynamic or live video content (as opposed to static video content, such as VOD content for example), will typically be configured to play this content using the information contained in the manifest associated with the content.

Playing live multimedia content, i.e. content delivered in dynamic mode, on the basis of the associated manifest however has limitations, with regard to certain new use cases involving splicing from a first live content in the process of being played to a second live content. Specifically, existing mechanisms making it possible to splice from a first multimedia content to a second multimedia content do not allow these new use cases to be satisfactorily managed.

The aim of the invention is to improve the situation.

According to a first aspect, a method of managing multimedia contents is proposed. The method comprises, in one or more embodiments: obtaining a first set of multimedia-content description metadata describing a first multimedia content delivered in dynamic mode; on reading, from the first set of metadata, a splice indicator indicating a splice to a second set of multimedia-content description metadata, reading, from the first set of metadata, an address storage indicator; and storing, in a memory, an address of the first set of metadata.

The proposed method advantageously makes it possible to use a splice indicator inserted into a set of metadata to manage the use cases of playing multimedia content involving a first splice from a content delivered in live mode to a second content delivered in live mode followed by a second splice to return, from the second content, to playing the first content. These use cases, sometimes referred to as "cut-away", cannot be implemented with certain specifications, for example the specification of the standard ISO IEC 23009-1 ("Information technology—Dynamic adaptive streaming over http (DASH)—Part 1: Media presentation description and segment formats", $3^{rd}$ edition). Specifically, the DASH specification provides for inserting, into a first manifest corresponding to a first content delivered in live mode, a manifest chaining descriptor, which makes it possible to trigger a splice of a DASH client reading from the first manifest to a second manifest, the second manifest corresponding to a second content delivered in live mode. However, once the splice has been performed, the DASH client does not know how to go back to the first manifest, and therefore no longer knows how to access the first live content. The proposed method advantageously addresses this limitation, by organizing the saving, in a memory, of an address where the DASH client may access the first manifest, on reading a manifest chaining descriptor.

The proposed method is particularly suitable, albeit non-limitingly, for playing, with a player terminal device, multimedia contents delivered in live mode in an MPEG DASH, HLS, HDS, MSS or HAS format. However, it is also suitable for playing multimedia contents delivered in live mode in any format in which the contents are played using sets of multimedia-content description metadata corresponding to multimedia contents delivered in live mode.

The proposed method will possibly advantageously be implemented in any device configured to play multimedia content, on the basis of a set of multimedia-content description metadata, for example in accordance with the MPEG DASH, HLS, HDS, MSS, or HAS standards, such as, non-limitingly, any computer, smartphone, user equipment, video player, video player terminal, tablet, etc.

In one or more embodiments, the second set of metadata could describe a second multimedia content, possibly also delivered in dynamic mode.

In one or more embodiments, the splice indicator indicating a splice from the first set of multimedia-content description metadata to the second set of multimedia-content description metadata may comprise a chaining indicator indicating the chaining of sets of metadata.

In one or more embodiments, the splice indicator indicating a splice from the first set of multimedia-content description metadata to the second set of multimedia-content description metadata may comprise an address of the second set of metadata.

In one or more embodiments, wherein the address stored in a memory may correspond to that from which the first set of metadata was downloaded from a server.

In one or more embodiments, the method may further comprise: splicing reading from the first set of multimedia-content description metadata to the second set of multimedia-content description metadata indicated by the splice indicator.

In one or more embodiments, the method may further comprise: on reading, from the second set of metadata, a return indicator, splicing reading from the second set of metadata to the first set of metadata using the address of the first set of metadata.

Thus, the proposed method advantageously makes it possible, in one or more embodiments, to bring about the return splicing of a player terminal from a second set of metadata corresponding to a second content to a first set of metadata corresponding to a first live content.

In one or more embodiments, the first and second sets of metadata are manifests in DASH, "Dynamic adaptive streaming over http", format.

In one or more embodiments, the splice indicator and the address storage indicator are in DASH, "Dynamic adaptive streaming over http", format.

In one or more embodiments, the return indicator is in DASH, "Dynamic adaptive streaming over http", format.

In one or more embodiments, the address storage indicator comprises a Uniform Resource Name, URN, descriptor of type: urn:mpeg:dash:origin-set or um:mpeg:dash:origin-set:2019.

In one or more embodiments, the return indicator comprises a Uniform Resource Name, URN, descriptor of type: urn: urn:mpeg:dash:origin-back or: urn:mpeg:dash:origin-back:2019.

According to a second aspect, a device for playing multimedia content is proposed, this device comprising a processor and a memory that is operationally coupled to the processor, wherein the processor is configured to implement the proposed method according to one or more embodiments.

According to another aspect, a first set of multimedia-content description metadata describing a first multimedia content delivered in dynamic mode is proposed, this set comprising an address storage indicator for the storage, in a memory, of an address of the first set of metadata by a device using the first set of metadata.

According to another aspect, a second set of multimedia-content description metadata describing a second multimedia content is proposed, this set comprising a return indicator for splicing reading, by a device using the second set of metadata, to a first set of multimedia-content description metadata on the basis of an address of the first set of metadata stored in a memory by a device using the first set of metadata.

According to another aspect, a method for managing multimedia contents is proposed, which method comprises, in one or more embodiments: obtaining a first set of multimedia-content description metadata describing a first multimedia content delivered in dynamic mode; and on reading, from the first set of metadata, an address storage indicator, storing, in a memory, an address of the first set of metadata.

According to another aspect, a method for managing multimedia contents is proposed, which method comprises, in one or more embodiments: obtaining a second set of multimedia-content description metadata describing a second multimedia content delivered in dynamic mode; and on reading, from the second set of metadata, a return indicator indicating a return to a first set of multimedia-content description metadata, splicing reading to the first set of metadata on the basis of an address of the first set of metadata stored in a memory.

According to another aspect, the following are provided: a computer program, which is loadable into a memory associated with a processor, and comprises segments of code for implementing the proposed method according to one or more embodiments on execution of said program by the processor, and a data set representing, for example in compressed or encoded format, said computer program.

Another aspect relates to a non-volatile medium for storing a computer-executable program, comprising a data set representing one or more programs, said one or more programs comprising instructions that, on execution of said one or more programs by a computer comprising a processing unit operationally coupled to memory means and to an input/output interface module, cause the computer to manage multimedia content according to one or more embodiments of the proposed method.

BRIEF DESCRIPTION OF THE DRAWINGS

Other particularities and advantages of the present invention will become apparent from the following description of non-limiting embodiments, which description is given with reference to the appended drawings, in which:

FIG. 2a illustrates an example of a set of multimedia-content description metadata (or manifest).

FIG. 2b illustrates an example of a set of multimedia-content description metadata (or manifest).

FIG. 6a illustrates an example of a set of multimedia-content description metadata (or manifest) according to one or more embodiments.

FIG. 6b illustrates an example of a set of multimedia-content description metadata (or manifest) according to one or more embodiments.

DETAILED DESCRIPTION

Figure 1:
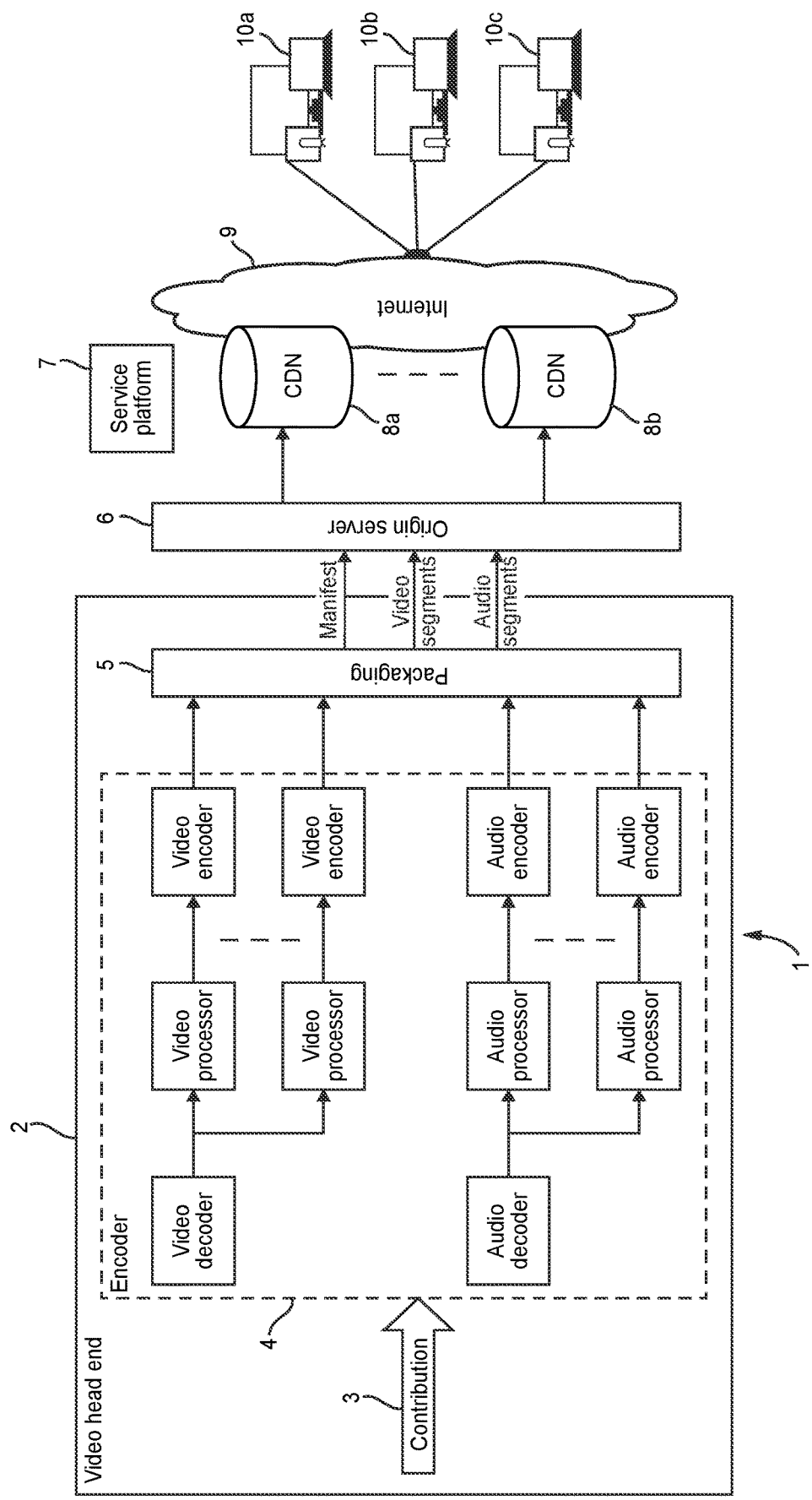
FIG. 1 illustrates an example of delivery infrastructure according to one or more embodiments.

In the following detailed description of embodiments of the method, many specific details are presented to provide a more complete understanding. Nevertheless, a person skilled in the art may realize that embodiments may be implemented without these specific details. In other cases, well-known characteristics are not described in detail to avoid needlessly complicating the description.

The present description refers to functions, engines, units, modules, platforms, and illustrations of diagrams of the methods and devices according to one or more embodiments. Each of the functions, engines, modules, platforms, units and charts described may be implemented in the form of hardware, software (including in the form of firmware or middleware), microcode, or any combination thereof. In the case of implementation in software form, the functions, engines, units, modules and/or illustrations of diagrams may be implemented by computer-program instructions or software code, which may be stored or transmitted on a computer-readable medium, including a non-volatile medium, or a medium loaded into the memory of a generic or specific computer, or of any other programmable apparatus or device for processing data, to produce a machine such that the computer-program instructions or the software code executed on the computer or the programmable apparatus or device for processing data form means of implementing these functions.

Embodiments of a computer-readable medium include, non-exhaustively, computer storage media and communication media, including any medium that facilitates the transfer of a computer program from one location to another. By "computer storage medium/media" what is meant is any physical medium that may be accessed by a computer. Examples of computer storage media include, non-limitingly, flash-memory components or disks or any other flash-memory devices (e.g. USB keys, memory sticks), CD-ROMs or other optical data-storage devices, DVDs, magnetic-disk-based data-storage devices or other magnetic data-storage devices, memory components for storing data, RAMs, ROMs, EEPROMs, memory cards (smart cards), SSD memories (SSD standing for solid state drive), and any other form of medium that may be used to transport or store data or data structures that may be read by a computer processor.

Furthermore, various forms of computer-readable medium are able to transmit or transport instructions to a computer, such as a router, gateway, server, or any equipment for transmitting data, whether it be a question of wired transmission (via coaxial cable, optical fiber, telephone wires, DSL cable, or Ethernet cable), of wireless transmission (via infrared, radio, cell, microwaves), or of transmission using virtualized transmitting equipment (virtual router, virtual gateway, virtual tunnel end point, virtual firewall). The instructions may, depending on the embodiments, comprise code in any computer programming language or of any computer program element, such as, non-limitingly, assembly languages, C, C++, Visual Basic, HyperText Markup Language (HTML), Extensible Markup Language (XML), HyperText Transfer Protocol (HTTP), Hypertext Preprocessor (PHP), SQL, MySQL, Java, JavaScript, JavaScript Object Notation (JSON), Python, and bash scripting.

In addition, the terms "in particular", "especially", "for example", "example" and "typically" are used in the present description to designate examples or illustrations of non-limiting embodiments, which do not necessarily correspond to embodiments that are preferred or advantageous with respect to other possible aspects or embodiments.

By "server" or "platform" what is meant in the present description is any point of service (whether virtualized or not) or device hosting data-processing operations, one or more databases, and/or data-communication functions. For example, non-limitingly, the term "server" or the term "platform" may refer to a physical processor that is operationally coupled with associated communication, database and data-storage functions, or refer to a network, group, set or complex of processors and associated data-storage and networking equipment, and to an operating system and one or more database systems and applications that support the services and functions provided by the server. A computing device may be configured to send and receive signals, via one or more wireless and/or wired transmission networks, or may be configured to process and/or store data or signals, and may therefore operate as a server. Thus, equipment configured to operate as a server may include, by way of non-limiting examples, dedicated rack-mounted servers, desktops, laptops, service gateways (sometimes referred to as "boxes" or "residential gateway"), multimedia decoders (sometimes called "set-top boxes") and integrated equipment combining various functionalities, such as two or more of the functionalities mentioned above. The servers may vary widely in their configuration or capabilities, but a server will generally include one or more central processing units and a memory. A server may thus include one or more mass-memory devices, one or more power supplies, one or more wireless and/or wired network interfaces, one or more input/output interfaces, and one or more operating systems, such as Windows Server, Mac OS X, Unix, Linux, FreeBSD, or an equivalent.

By multimedia content, what is meant in the present description is any audio and/or video content, subtitles, data, audiovisual content, music, sound, image, or interactive graphical interface, and any combination of these types of content.

The terms "network" and "communication network" such as used in the present description refer to one or more data links which may couple or connect equipment, possibly virtualized equipment, so as to allow the transport of electronic data between computer systems and/or modules and/or other electronic devices or equipment, such as between a server and a client device or other types of devices, including between wireless devices coupled or connected by a wireless network, for example. A network may also include a mass memory for storing data, such as a NAS (network attached storage), a SAN (storage area network), or any other form of media readable by a computer or by a machine, for example. A network may comprise, in whole or in part, the Internet, one or more local area networks (LANs), one or more wide area networks (WANs), wired connections, wireless connections, cellular connections, or any combination of these various networks. Similarly, subnets may use various architectures or be compliant or compatible with various protocols, and interoperate with larger networks. Various types of equipment may be used to make various architectures or various protocols interoperable. For example, a router may be used to provide a communications link or a data link between two LANs that would otherwise be separate and independent.

The terms "operationally coupled", "coupled", "mounted" and "connected" and the various variations and forms thereof used in the present description refer to couplings, connections and mountings that may be direct or indirect, and that in particular comprise connections between electronic equipment, or between portions of such equipment, that allow operations and functions such as described in the present description to be implemented. In addition, the terms "connected" and "coupled" are not limited to physical or mechanical connections or couplings. For example, an operational coupling may include one or more wired connections and/or one or more wireless connections between two or more pieces of equipment, allowing simplex and/or duplex communication links to be set up between the equipment or portions of the equipment. According to another example, a connection or an operational coupling may include a coupling via a wired and/or wireless link, to allow communication of data between a server of the proposed system and another piece of equipment of the system.

The term "application" (AP) and its variants (app, webapp, etc.) such as used in the present description correspond to any tool which functions and is operated by means of a computer, to provide or execute one or more functions or tasks for a user or another application. In order to interact with an application, and to control it, a user interface may be provided on the equipment on which the application is implemented. For example, a graphical user interface (GUI) may be generated and displayed on a screen of the user device, or an audio user interface may be rendered to the user using a loudspeaker, headphones or an audio output.

The terms "multimedia content" such as used in the present description correspond to any audio and/or video or audiovisual content.

In the present description, the terms delivery "in real-time", delivery "in linear mode", delivery in "linear TV mode", delivery "in dynamic mode" and delivery "live" or "in live mode" are used interchangeably to designate delivery in dynamic mode or of dynamic type (i.e. live or dynamic delivery) of a multimedia content in a system for delivering contents to terminals, comprising in particular the delivery of the content as it is generated, as opposed to the delivery of a previously generated content on access request by a user (delivery on demand or delivery in "static" mode or of "static" type), such as, for example, a content stored on a server, and made available to users via a video-on-demand (VOD) service.

In the present description, the term "live content" refers to content, for example multimedia content, that is distributed, for example using an OTT distribution mode, in dynamic mode (as opposed to the static distribution mode). A live content will typically be generated by a television channel, or by any type of producer of televisual media, and will moreover be broadcast over a multimedia content broadcast network, in addition to being made available on content servers in an OTT delivery system.

In the present description, the terms "terminal", "user equipment", "player", "player device", "player terminal" and "video player" are used interchangeably to designate any type of device, implemented via one or more software packages, one or more pieces of hardware, or a combination of one or more software packages and one or more pieces of hardware, that is configured to use a multimedia content delivered according to a multi-screen delivery protocol, in particular by loading and playing the content. The terms "client" and "video player client" are also used interchangeably to designate any type of device, software and/or hardware, or any function or set of functions, implemented by software and/or hardware within a device, and configured to use a multimedia content delivered according to a multi-screen delivery protocol, in particular by loading the content from a server and playing the content.

FIG. 1 illustrates an example of an architecture of a system (1) for delivering multimedia content, in which system the proposed method may be implemented. FIG. 1 shows a video delivery network head end (2) comprising a video encoding unit (4) that receives content to be encoded ("contribution") (3) as input, and delivers to a packager (5) encoded streams called "elementary streams". As illustrated in FIG. 1, a content received as input is encoded according to a plurality of encoding profiles (a profile being for example defined with codec, resolution and bit-rate parameters). Using a plurality of encoding profiles has at least two advantages: First of all, a plurality of profiles makes it possible to address player terminals with different characteristics (supported codecs, screen resolution, decoding power). Furthermore, it allows the video players of these terminals to adapt depending on the available network bandwidth. Specifically, the player of a client (of a terminal) may be configured to seek to achieve the encoding profile corresponding to the highest bitrate, depending on bandwidth measurements that it continuously performs.

The encoded streams (elementary streams) delivered by the video encoding unit (4) to the packager are split by the packager (5) into at least two sequences, audio and video sequences respectively, of successive segments, these segment generally being of set duration (typically a few seconds) and of format dependent on the chosen protocol (for example MPEG2-TS, MP4, etc.). For each content, a set of metadata relative to multimedia contents, or manifest, is also generated by the packager. It is typically a question of a file, for example in XML format, indicating the characteristics of each profile and the available segments corresponding to the content.

These manifests and the associated segments are supplied by the packager (5) to a content server (6) ("Origin server" in FIG. 1), then stored on content delivery networks (CDNs) (8a, 8b), these providing cache capacities that make it possible to improve the quality of service provided to users, and to minimize access times and the latency with which content may be viewed by player terminals.

The contents stored in the CDN servers (8a, 8b) are read accessible to user terminals (10a, 10b, 10c), by means of a service platform (7) for the delivery of the contents. Clients installed in the terminals (10a, 10b, 10c) may access the contents stored on the CDN servers via one or more data communication networks, such as for example the Internet (9), as illustrated in the figure.

FIG. 2a illustrates an example of the content of an XML file corresponding to a manifest using the DASH (or MPEG-DASH) format. A manifest of this type contains a tree structure of nested XML containers, as shown in FIG. 2a. Although this description provides examples of embodiments based on the DASH format, as specified in the third edition of the document ISO/IEC 23009-1 "Information Technology—Dynamic adaptive streaming over HTTP (DASH)—Part 1: Media presentation description and segment formats", those skilled in the art may realize that the proposed methods are not limited to a particular type or format of manifest (or set of multimedia-content description metadata), and that they are applicable to any type of manifest, such as manifests using other OTT-delivery protocols and formats, such as for example the HLS, MSS and HDS protocols and formats mentioned above.

The DASH manifest shown in FIG. 2a has a hierarchical structure organized according to the following tree structure:

A root element of the document (i.e. the media presentation description, or MPD) contains the attributes applicable to all of the elements of the document (the other elements being sometimes called "child" elements).

The "MDP" root may, in addition to "child" elements, define values of attributes, including the following attributes which relate to the delivery of a live content:

The attribute "type" defines the type of content delivery: "static" for contents delivered in static mode (typically contents delivered by a video-on-demand (VOD) service) and "dynamic" for contents delivered in dynamic mode.

The attribute "AvailabilityStartTime", which relates to the dynamic delivery mode, defines the date (for example in coordinated-universal-time (UTC) format) of availability of the first segment generated for the current service. This information may be used to indicate the start time of the service, so as to be used by a player terminal as a time point to which to anchor the start of the service.

The attribute "PublishTime" indicates a date of generation of the manifest and of its publication on the CDN. This information makes it possible to store various versions of the same manifest corresponding to successive publications, in order to detect changes that have occurred from one publication to another.

The attribute "AvailabilityEndTime" indicates a date of generation of the oldest segment still available.

The attribute "MinimumUpdatePeriod" defines the shortest period between potential changes in the MPD. The value of this attribute may be used by the content player terminal to configure a frequency at which it downloads the manifest, being informed of the fact that the manifest will be updated by the packager at least at the frequency indicated by this attribute.

The attribute "MinBufferTime", which is mandatory in the format example shown in FIG. 2a, defines a common duration used in the definition of the bitrates of the representations.

The attribute "TimeShiftBufferDepth" defines the duration of the shortest timeshift buffer for all the representations of the manifest, guaranteeing the availability of segments for deliveries of dynamic type. Its value indicates the past period for which the content associated with the manifest, delivered in dynamic mode, is available on the CDN server. This value may for example be equal to 1 minute, in which case the player may rewind ("live" content) by one minute, or retrieve one minute of live content in the case where the user uses the "pause" function to interrupt playback of live content.

The attribute "SuggestedPresentationDelay" defines a set time delay that may be applied during the presentation of each access unit. This parameter makes it possible to get as close as possible to the live edge of the content, to ensure that all player terminals playing the same live content will play it at the same place. For example, the player may be configured to start playing 4 seconds in the past, to give a margin of safety in relation to the course of the live content.

The "UTCTiming" attribute provides a common clock between the packager and the player terminal (or video player). It makes it possible to indicate to the terminal a means allowing a clock synchronized with the content server to be retrieved.

In addition, "child" elements, in the form of containers that may be nested within each other, may be included in the manifest to specify the files accessible through the manifest. With reference to FIG. 2a, these "child" elements may be:

An element of type "Period", describing a time interval, bounded or not in time. One or more attributes may be provided for an element of "Period" type, among which attributes an attribute ("id") identifying the period ("id="P0"" in FIG. 2), an attribute ("start") defining period start time ("start="PTOS"" in FIG. 2), and an attribute ("duration") defining period duration (not present for an open period, i.e. one that has not yet ended). The value of the attribute defining period start time (0 seconds in the example shown in FIG. 2a) will possibly be combined with the value of the element "availabilityStartTime" described above).

Each child element of "Period" type may itself contain child elements. For example, as illustrated in FIG. 2a, an element of "Period" type may contain two child elements of "AdaptationSet" type each corresponding to one type of content.

The element of "AdaptationSet" type is a container that allows available contents to be described depending on their type. It makes it possible to group together elements regarding the same component of a multimedia content (such as audio, video or subtitles) but encoded with different parameters (different bit rates, resolutions, frame rates, sampling rates). In the example of FIG. 2, only one encoding profile is available, and this profile is described with respect to its video component (contentType="video" id="0" maxFramerate="25" maxHeight="1080" maxWidth="1920" mimeType="video/mp4" minFrameRate="25" minHeight="1080" minWidth="1920" par="16: 9" segmentAlignment="true" startWithSAP="1") and with respect to its audio component (contentType="audio" id="1" lang="und" mimeType="audio/mp4" segmentAlignment="true" startWithSAP="1"). A video player may thus, for example, quickly obtain the video-encoding-profile parameters used to encode the content described in the manifest illustrated in FIG. 2: bandwidth, parameters of the video encoder, frame rate, resolution, format of the images, etc. ("bandwidth="4000000" codecs="hev1.2.4. L120.90" frameRate="25" height="1080" id="v1" sar="1:1" width="1920"").

Encoding parameters may be supplied via the "Representation" element, which makes it possible to precisely describe the encoding parameters and parameters of access to a component of the media.

FIG. 2b illustrates a manifest in DASH format containing a splice indicator indicating a splice to another manifest corresponding to another content in the form of a chaining indicator, also called a chaining descriptor. The specification ISO/IEC 23009-1 "Information Technology—Dynamic adaptive streaming over HTTP (DASH)—Part 1: Media presentation description and segment formats" defines the insertion of a splice indicator indicating a splice to another manifest in a manifest in DASH format.

Some of the elements specified by the DASH standard and described above are found in the manifest of FIG. 2b. In addition, this manifest comprises a chaining indicator inserted with DASH syntax into an additional information container (SupplementalProperty): schemeIdUri="urn: mpeg:dash:mpd-chaining:2016".

This chaining descriptor will be taken into account by a DASH client which uses the manifest to access at least one content delivered in dynamic mode when it has finished consuming (playing) the content corresponding to the time-interval container: <Period id="P0"

start="PT0S"><AdaptationSet id="0" contentType="video" . . . ></AdaptationSet><AdaptationSet id="1" contentType="audio" . . . ></AdaptationSet></Period>.
When the time period corresponding to this content ends, the packager will receive a splice-out order, whereupon it will close the current period by updating the current manifest with a period end in the corresponding time-interval container (the period identifier "P0" in the example shown).

The DASH client will download the updated manifest, in which the period ("P0") will be closed, for example in the context of the periodic downloading of the current manifest. On reading the updated manifest, the client will determine that the previously current period is closed, and it will continue its linear reading of the manifest, which will lead it to read, from the updated manifest, the additional information container containing the chaining indicator. In the example shown in FIG. 2b, the chaining indicator comprises a chaining descriptor (rn:mpeg:dash:mpd-chaining:2016) embedded in the manifest as an attribute of the additional information container, and a URL address of the splice target manifest (http:// . . . /live2/manifest.mpd).

Upon reading the chaining descriptor, the DASH client splices to the target manifest, on the basis of the address of this target manifest supplied with the chaining descriptor. If the target manifest corresponds to a container delivered in dynamic mode, the DASH client reads this information in the "type" element of the target manifest, and resumes the current period for the corresponding live content.

Figure 3:
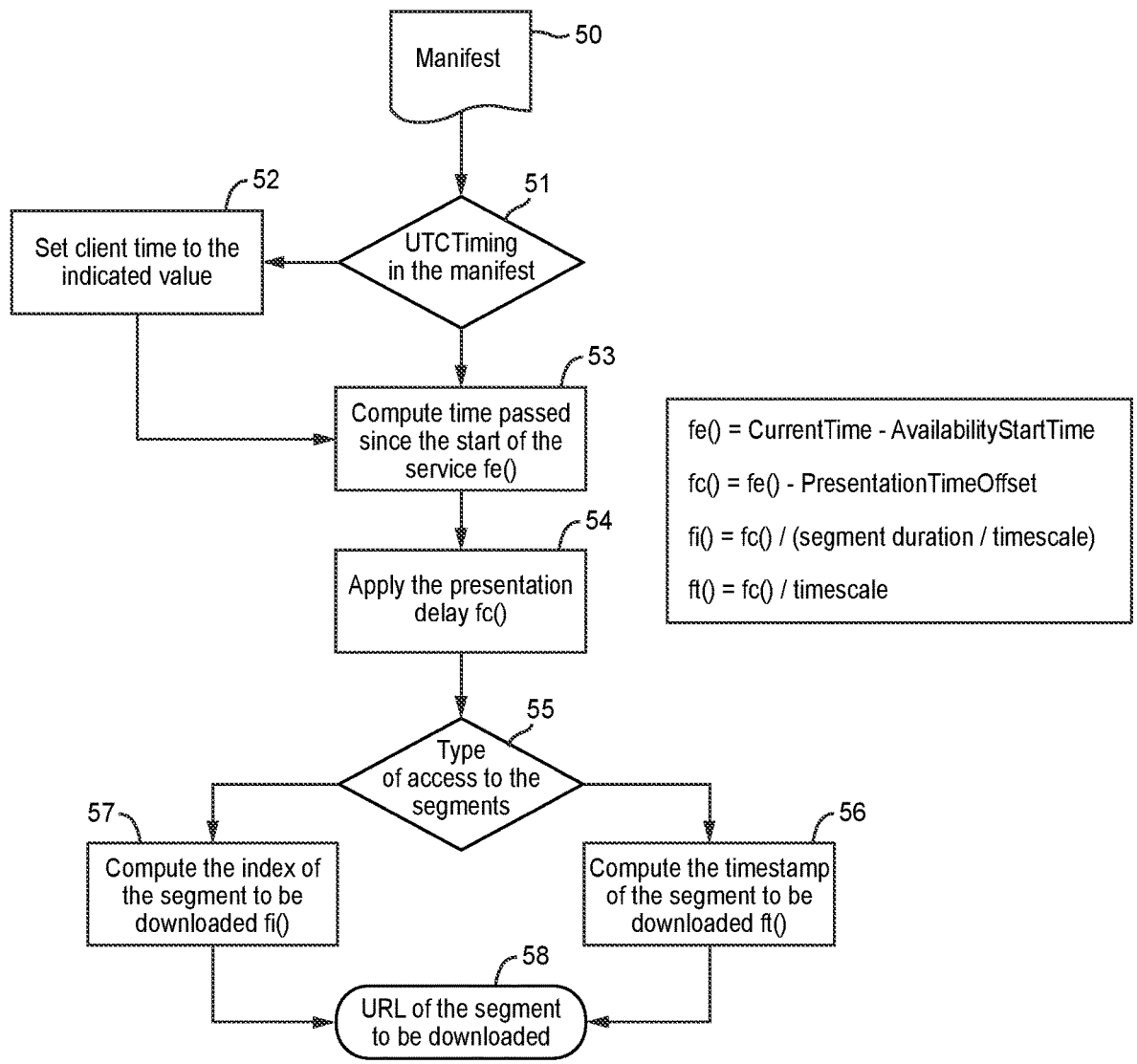
FIG. 3 presents the method for computing the segment to be downloaded in the case of multimedia content delivered in dynamic mode.

FIG. 3 illustrates an example of a method for playing live content using a video player client (or a video player). The illustrated method uses some of the information described above with respect to the example manifest illustrated in FIG. 2a to determine the data segment to download for each "AdaptationSet" of the current period, and thus to allow the client to tie into the content to be played.

The playback of a live content in the MPEG-DASH format is mainly linear. On its connection to the content server, the client initially retrieves the manifest containing information specific to the content delivered in dynamic mode (i.e. live), then begins the playback at the location of the content corresponding to the current time (in order to follow an event taking place in real time (a live event)). To do this, it determines the current period by computing the time passed since the "availabilityStartTime" value indicated in the manifest, then determines the number of the "live" segment of this period by the same means.

With reference to FIG. 3, in one or more embodiments, the client obtains (50) a manifest corresponding to the live content to be played, then synchronizes (51) (52) with a media-content server via the value of the attribute "UTC-timing" indicated in the manifest.

On the basis of the attribute "availabilityStartTime" and the current time ("CurrentTime"), the client may then determine (53) the time fe( ) passed since the start of the live multimedia content. As discussed above, depending on the encoding conditions, a delay ("PresentationTimeOffset") may be applied (54) to the transmission of the multimedia content in order to allow the encoder time to encode the segments, this leading to the determination of a time fc ( ) defined by fe ( )—PresentationTimeOffset. Lastly, depending on the size of the segments ("segment duration") defined in the manifest, and on a time-scale parameter ("TimeScale"), an index (57) fi ( ) or a timestamp (56) ("TimeStamp") ft ( ) of the current time segment may be calculated, depending on the type of segment (55). On the basis of this information, the client may obtain (58) a download address (for example a uniform resource locator (URL)), then download the segment of the current time of the multimedia content. An index of the segment of the current time will possibly for example be obtained by dividing the value fc( ) by the duration of one segment ("segment duration") divided by the time-scale value ("timescale"): fi( )=fc( )(segment duration/timescale). A timestamp of the segment of the current time will possibly for example be obtained by dividing the value fc( ) by the time-scale value ("timescale"): ft( )=fc( )/timescale.

The values described above are supplied by the provider to the client through the manifest. The content provider may further influence the behavior of the client through means other than the manifest that the client downloads, and in particular through means such as insertion of a notification into a data segment. Thus, the insertion of a specific marker (for example taking the form of a "box") identified by a predetermined tag makes it possible to communicate control messages to the client. For example, the insertion of an "emsg" box into a data segment makes it possible to indicate to the client that it must immediately reload the manifest. Thus, a client configured to play an MP4 file or MPEG2 TS file (TS standing for transport stream) will parse this file (in its tree form) to detect all the information present therein, in particular including information notifying a request to load the manifest (for example notified via an "emsg" notification). It is thus possible to signal an unforeseen event that must be taken into account as soon as possible, thereby overriding the value of the attribute "minimumUpdatePeriod", which is more suitable for incremental modifications of the manifest.

A number of scenarios may, however, interrupt the logic of delivery of an event in dynamic mode, i.e. logic such as described above and illustrated in FIG. 3, one example being when it is desired to splice the client to a multimedia content other than the one being played (this content corresponding to a manifest referred to as the "main" manifest), to subsequently return to the initial content. These interruptions in the playing of a first live multimedia content in order to play a second live multimedia content and then returning, after an indefinite amount of time, to playing the first live multimedia content, called "cutaway" in the present description, may, for example, correspond to use cases such as the insertion of targeted advertisements, events that are also taking place in real time such as, for example, a regional cutaway from a national television channel, or the broadcasting of a warning message.

The context of the particular case of insertion of targeted advertisements is as follows: During a commercial break in a content delivered in dynamic mode (live content), default advertisements are inserted into the initial data stream, i.e. the stream corresponding to the live content being played. The content provider may decide to redirect clients to targeted advertisements based on their respective profiles. To do this, the current period indicated in the current manifest (corresponding to the live content being played) may be closed, and a new period of a duration equal to that of the initial advertisement may be inserted into the current manifest, in the form of a time-interval description container ("Period" in the case of a container of a manifest in DASH format).

This time-interval description container may contain redirect data (for example indicated in an xml file by a redirect link of the "xlink" (XML linking language) type, which type is specified in the W3C recommendation "W3C XLINK XML Linking Language (XLink) Version 1.1, W3C Recommendation") redirecting to an ad server which, depending on a profile of the user of the client, will return a new manifest allowing advertisements tailored to this user to be accessed. The client will play the content described by the time-interval description container ("Period") of this new manifest for the duration of the period defined by the container. At the end of this period, the client will return to the current manifest in which the advertisement period will also have been closed and a new live period inserted in the form of another time-interval description container.

The particular case of a regional cutaway may be encountered when a television channel, such as the TV channel France 3, is broadcasting in real time national TV news programs that then cutaway at set times to regional TV news programs. This use case is similar to that of advertisements because the duration of the cutaway is known in advance. In contrast, it is possible to imagine regional cutaways of durations that vary depending on the region.

Regarding the particular case of warning dissemination, regulations make provision for systems that allow current programs to be interrupted and warning messages broadcast. These messages may be pre-recorded and therefore of known duration, or be produced in real time. In the latter case, the duration of the interruption is not known in advance.

However, it turns out that the particular case of splicing from a first live content to a second content without knowing the duration of the interruption of the playback of the first live content cannot be correctly managed, as explained below.

Specifically, these splices between multimedia contents are caused by the use of stream-splicing orders originating from equipment located upstream of the audio/video encoder. On receipt of these orders, the packager modifies the current manifest (corresponding to the live content being delivered) to notify the terminals consuming this content of a change.

Among these stream-splicing orders, the order to splice to another stream ("splice out") indicates to the client that it must splice from a primary stream to a secondary stream, and the return order ("splice in") indicates to the client that it must return to the primary stream.

Splicing from a live primary stream to a live secondary stream (the two streams being delivered in dynamic mode), which is known as "live-live splicing" has drawbacks that are detailed below.

The DASH standard makes provision for a mechanism, called manifest chaining, for splicing between 2 live contents, which mechanism consists in making the DASH client splice from a first live content to a second live content by switching to a new manifest (corresponding to the second content), from a first manifest (corresponding to the first live content). This mechanism thus results in the client splicing to a secondary manifest, different from the manifest being used by the client (called the "primary" manifest or "current" manifest), through the insertion of a splice indicator indicating a splice to another manifest, which indicator provides the client with access information for accessing the secondary manifest.

However, during this splice, the player loses knowledge of the primary manifest, making it complicated, if not impossible, to return to the first live content at the end of the splicing period (for example at the end of the live content corresponding to the warning in the aforementioned particular case of a broadcast warning).

Figure 4:
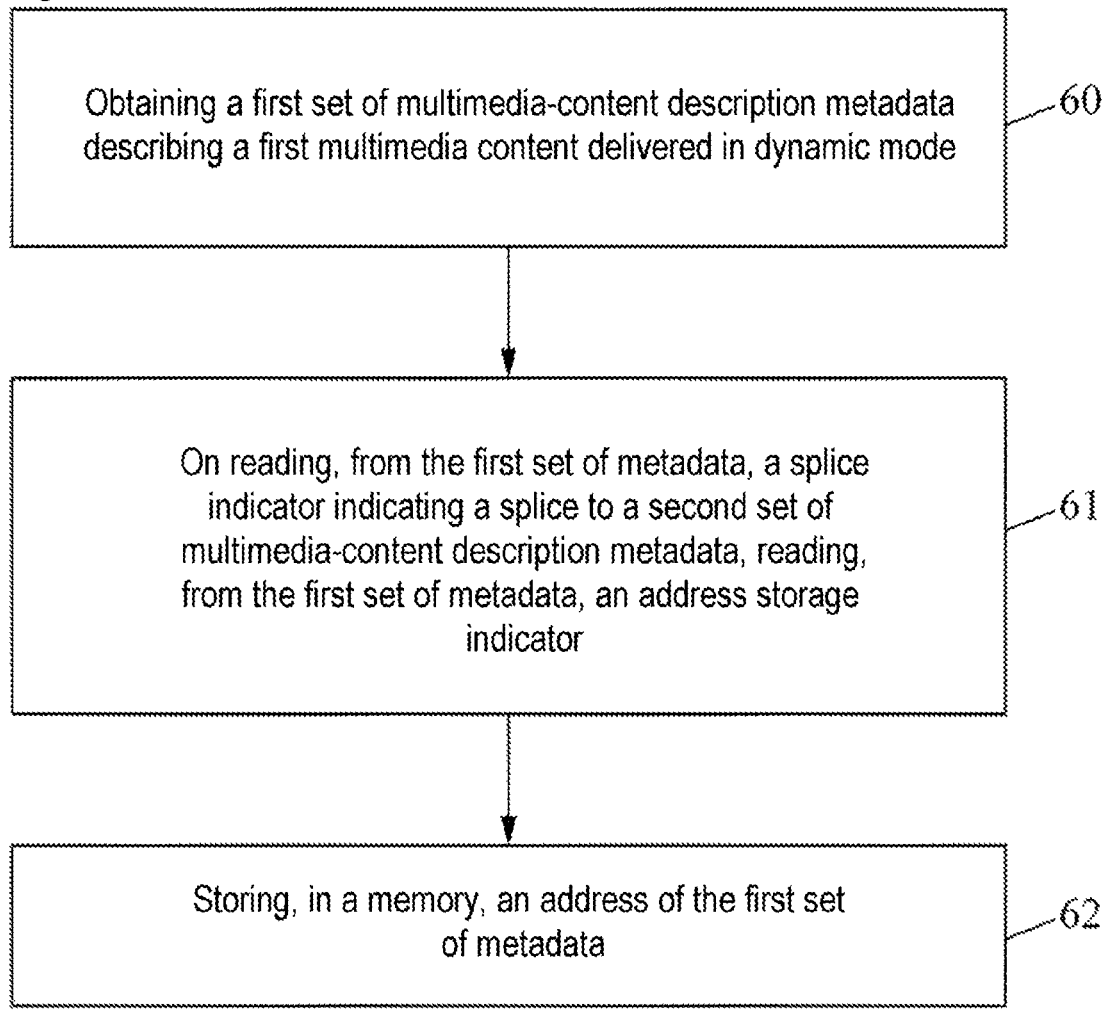
FIG. 4 illustrates the proposed method according to one or more embodiments.

FIG. 4 illustrates the proposed method according to one or more embodiments. This method may be implemented by any device comprising a processor and a memory, and configured to implement it, such as, for example, a multi-media content player, a terminal, a device running a DASH client or a client configured to receive and play multimedia contents using any other OTT protocol for delivering multimedia contents, or a user device (smartphone, tablet, computer, etc.) equipped with a multimedia content player.

In one or more embodiments, the device configured to implement the method may be configured to obtain (60) a first set of multimedia-content description metadata (for example, for a DASH client, a first manifest in the format of the DASH protocol, and for example in the form of an XML file). The first set of metadata may describe a first multimedia content delivered in dynamic mode, for example by means of metadata relative to a first multimedia content delivered in dynamic mode and included in the first set.

The device may further be configured to read the first set of metadata, and to, on reading, from the first set of metadata, a splice indicator indicating a splice to a second set of multimedia-content description metadata, read (61), from the first set of metadata, an address storage indicator; and then store (62), in a memory, an address of the first set of metadata.

Depending on the embodiment, the device may be configured to determine, on reading the splice indicator, whether or not the address storage indicator is present in the first set of metadata, or to, on reading the splice indicator, read an address storage indicator.

Advantageously, to allow a cutaway, that is to say a first splice from a first live content to a second content (which is not necessarily live), and then a second splice (back) from the second content to the first live content, the device may be configured to, as the first set of metadata (corresponding to the first live content) is being read, on reading, from the first set of metadata, a read splice indicator indicating a splice from reading from the first set of metadata corresponding to the first live content to another set of metadata, read an address storage indicator, and on reading this indicator, store, in a memory, an address of the first set of metadata.

Depending on the case, the second content to which it will splice from the first live content will not necessarily be live. It could, for example, be content delivered in static mode (as opposed to in dynamic mode), for example VOD content delivered on demand of a user.

The splice from a first live content to a second content may thus advantageously be prepared by preparing a possible return to the first live content by means of the address of the manifest corresponding to this first live content, stored in a memory, and therefore accessible to the device, which will make it possible to avoid the drawbacks mentioned above.

Thus, in one or more embodiments, the address storage indicator may be read from the first set of metadata and interpreted by the device in conjunction with a splice indicator present in the first set of metadata.

In one or more embodiments, the splice indicator indicating a splice from the first set of multimedia-content description metadata to the second set of multimedia-content description metadata may comprise a chaining indicator indicating the chaining of sets of metadata, as is the case, for example, specified in the DASH standard with the manifest chaining descriptor, in particular in table 4.2 of the specification ISO/IEC 23009-1 $3^{rd}$ edition.

Furthermore, the splice indicator indicating a splice from the first set of multimedia-content description metadata to the second set of multimedia-content description metadata will typically comprise an address of the second set of metadata, so as to allow the splice to this second set of metadata.

In one or more embodiments, the address of the first set of metadata stored in a memory by the device configured to implement the proposed method will correspond to the address used by the device to download this first set of metadata, for example to download the latest updated version of this first set of metadata.

In one or more embodiments, the proposed method advantageously allows the return to playing the first live content by means of a return indicator inserted into the second set of metadata. On reading this return indicator, the device configured to implement the proposed method will be able to obtain the address, previously stored in a memory, of the first set of metadata, and splice back for reading to the first set of metadata, using this address to download the first set of metadata and use this first set to resume playing the corresponding first live content.

In one or more embodiments, the return indicator could be read from the second set of metadata and bring about a switch to the first set of metadata on the basis of the address previously stored in a memory. As a variant, the return indicator could be read from the second set of metadata and interpreted by the device in conjunction with a splice indicator present in the second set of metadata.

In one or more embodiments, the first and second sets of metadata may be manifests in DASH, "Dynamic adaptive streaming over http", format, for example as illustrated in the present description. In addition, the splice indicator and the address storage indicator could also be in DASH format, as could the return indicator.

Thus, in one or more embodiments, a first set of multimedia-content description metadata describing a first multimedia content delivered in dynamic mode is proposed, this set comprising an address storage indicator for the storage, in a memory, of an address of the first set of metadata by a device using the first set of metadata. The insertion, into a manifest, of a storage indicator, for example comprising a URN, with the corresponding syntax, of type urn:mpeg:dash:origin-set or an equivalent, in the case of a DASH manifest, to indicate, to a device using the manifest, to store, in a memory, an address of the first set of metadata.

In one or more embodiments, a second set of multimedia-content description metadata describing a second multimedia content is further proposed, this set comprising a return indicator for splicing reading, by a device using the second set of metadata, to a first set of multimedia-content description metadata on the basis of an address of an address of the first set of metadata stored in a memory by a device using the first set of metadata. The insertion, into a manifest, of a return indicator indicating a return to a preceding manifest, for example comprising a URN, with the corresponding syntax, of type urn:mpeg:dash:origin-back or an equivalent, in the case of a DASH manifest, to indicate, to a device using the manifest, to return to the last manifest for which it stored an address in a memory.

In one or more embodiments, a method for managing multimedia contents is proposed, which method comprises: obtaining a first set of multimedia-content description metadata describing a first multimedia content delivered in dynamic mode; and on reading, from the first set of metadata, an address storage indicator, storing, in a memory, an address of the first set of metadata. Thus, the processing of a storage indicator inserted into a manifest as proposed may be performed independently of the reading, in the manifest, of a splice indicator indicating a splice to another manifest (for example a manifest chaining descriptor in the case of manifests in DASH format).

In one or more embodiments, a method for managing multimedia contents is proposed, which method comprises, in one or more embodiments: obtaining a second set of multimedia-content description metadata describing a second multimedia content delivered in dynamic mode; and on reading, from the second set of metadata, a return indicator indicating a return to a first set of multimedia-content description metadata, splicing reading to the first set of metadata on the basis of an address of the first set of metadata stored in a memory. Thus, the use of a return indicator as proposed may be effected independently of the method used to splice from a first set of metadata to a second set of metadata, and of the method used to be able to obtain an address of the first set of metadata in order to return to that first set.

Figure 5:
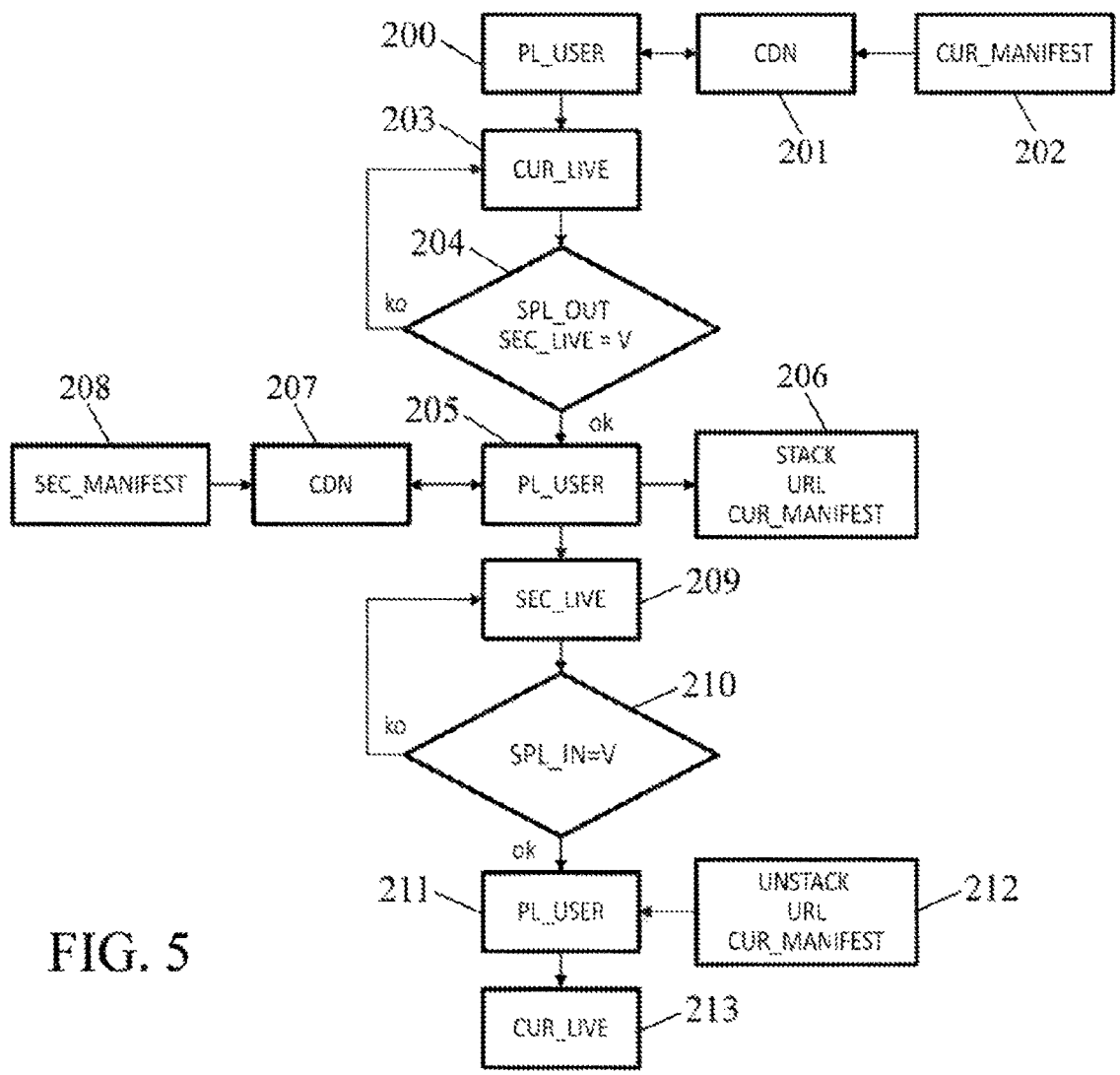
FIG. 5 illustrates the proposed method according to one or more embodiments.

FIG. 5 illustrates one exemplary embodiment of the proposed method allowing use of the splice mechanism of manifest-chaining type.

As explained above, the manifest-chaining mechanism accompanies a splice from a first content to a second content by effecting a splice from a first manifest corresponding to the first content to a second manifest corresponding to the second content.

In one or more embodiments using manifest chaining, the device, parsing the first set of metadata, will be able to read a splice indicator comprising a descriptor of the chaining of sets of metadata. The device may be configured to, on reading a descriptor of the chaining of sets of metadata, store, in a memory, an address of the first set of metadata. This address of the first set of metadata may be chosen so as to be of any type suitable for the implementation of the proposed method, such as for example of URL ("Uniform Resource Locator") type, or of URN ("Uniform Resource Name") type, and use the syntax corresponding to the chosen type. This first set of metadata address may further correspond, depending on the embodiment, to any information allowing the device to retrieve the data of the first set of metadata (that is to say of the first manifest) once the manifest splice has been performed.

Thus, during the splicing from a first multimedia stream corresponding to a first content delivered in dynamic mode to a second multimedia stream corresponding to a second content delivered in dynamic mode, the device will be able to splice the reading of the set of metadata from the first set of multimedia-content description metadata to a second set of multimedia-content description metadata indicated by the chaining descriptor.

Once the splice from a first live multimedia stream to a second live multimedia stream has taken place, the device will be able to play the multimedia content corresponding to the second stream, on the basis of the information obtained from the second set of metadata corresponding to the multimedia content. Information on the duration of playback of the second stream may be obtained by the device, for example by updating the second set of metadata, or on reading a return splice, as explained above. This information may correspond to a return chaining descriptor included in the second set of metadata, and the device may be configured to, on reading, from the second set of metadata, a return chaining descriptor (return indicator), splice the reading of the set of metadata to the first set of metadata using the previously stored address of the first set of metadata. The return to the first multimedia stream from which the splice was made is thus possible, since the information required for this return may be obtained by virtue of the reverse splicing of the sets of metadata (splicing back from the second manifest to the first manifest), which reverse splice is performed using the address of the first set stored before the splice from the first set of metadata to the second set of metadata.

Thus, in its current definition, the concept of "manifest chaining" makes it possible to splice from an initial manifest (also called a "current" manifest) to a new manifest. However, the information from the initial manifest is lost after the splice, making it difficult to return to the main stream after a time-limited cutaway. The proposed method addresses this problem by defining, in one or more embodiments, an address storage indicator which may be incorporated into the first manifest, possibly in combination with a splice indicator, and a return indicator which may be incorporated into the second manifest, possibly in combination with a splice indicator. For example, for manifests in DASH format, the use of an address storage indicator for the chaining descriptor (for example in the form of a new URN value: "urn:mpeg:dash:origin-set:2019") is proposed in one or more embodiments, and the use of a return indicator for the chaining descriptor (for example in the form of a new URN value: "urn:mpeg:dash:origin-back:20199") is further provided in one or more embodiments. In one or more embodiments, the return indicator inserted into the second manifest is not associated with an address of the first manifest (e.g. a URL), since this address has been previously stored. Consequently, the return indicator might not be associated with a cutaway indicator, and in particular with a cutaway indicator which comprises an address of the first manifest.

The two new indicators proposed advantageously make it possible to inform the DASH client that it must, in conjunction with the first splice, store, in a memory, the URL of the first manifest for the first and, in conjunction with the second splice, that it must return to a previously loaded period for the second.

In the case of a plurality of chainings performed in succession, the problem of identifying the origin arises. In one or more embodiments, the URN of the chaining descriptor may be extended with a predefined value, for example of the form "urn:mpeg:dash:origin-set:2019", indicating, to the DASH client, that the URL of the current manifest must be stacked before resolving the chaining and unstacked with each new URN indicating an address of the initial manifest ("urn:mpeg:dash:origin-back:2019").

With reference to FIG. 5, a DASH client wishing to play (200) a video sequence delivered in dynamic mode (current live stream) initially makes a request to a content delivery network (CDN) 201 in order to obtain the manifest, called the set of description metadata, of the current live stream, on provision of authentication information. The CDN executes a client-authentication procedure and, in case of success, returns a token to the client and redirects it to a network address (for example a URL) at which the current manifest (202) (corresponding to the current live stream) is accessible. The DASH client 200 may thus tie into the current live stream (203). To do this, the DASH client determines, from the information contained in the current manifest, for example using the method illustrated in FIG. 3, the segment that it must download, depending on the current time and the time passed, it for example doing this by determining an index of this segment or a timestamp as described above.

Once the DASH client has tied into the current stream (203), it continuously plays (404, ko) this current stream, in the absence of a client splice-out request.

On detecting (204) an order to splice to a secondary stream ("splice out") (SPL_OUT SEC LIV=V), the DASH client 205 is warned, by virtue of information contained in the updated current manifest (202), that a splice to a second live stream is required. This update request may be made via an "emsg box" incorporated into the video segment prior to the splice to the second live stream, and indicating, to the player, to reload the manifest without taking account of the "minimumUpdatePeriod" attribute value. Before authentication via the CDN (207) to retrieve the network address (e.g. URL) of the second manifest (208) comprising description metadata for the second live stream, the address (e.g. URL) of the current manifest is stacked 206 by the DASH client in a memory, which is, for example, managed in a LIFO ("last in, first out") mode. This stacking is, for example, performed via the URN ("Uniform Resource Name") value for the following descriptor: "urn:mpeg:dash:origin-set:2019". Once the address (e.g. URL) of the manifest of the current stream has been stored in a memory (e.g. stacked in a memory managed as a LIFO stack) (206), the chaining is resolved in order to allow the DASH client to obtain the manifest of the secondary stream (208) and the address (e.g. URL) of the associated segments. Once the splice to the secondary stream has been performed, the DASH client plays (209) this secondary stream.

As long as no update to this second manifest associated with the secondary live stream indicates a "splice in" order ("210 ko"), the DASH client will continue to play the secondary live stream. When this second manifest is updated to indicate an order to splice back to the current live stream ("splice in") ("210 ok"), a return descriptor, for example in the form of a URN value "urn:mpeg:dash:origin-back:2019", is inserted into the manifest. This new value without associated URL makes it possible to indicate, to the DASH client (211), to unstack the previously stored value (212). This unstacked value corresponds to the network address of the current manifest associated with the current live stream. The player 211 of the DASH client may thus, following the updating of the manifest of the secondary live stream indicating this order ("210 ok"), return to the current live stream (213).

The use of these two URN values allows the chaining of manifests, called "manifest chaining" without the major drawback of this mechanism explained above as specified in the third edition of the DASH standard. This drawback is mainly due to the loss of the information on the network address of the current manifest which is replaced with the network address of the second manifest.

FIG. 6a illustrates an exemplary manifest in DASH format into which an address storage indicator has been inserted according to one particular embodiment of the proposed method.

In the example shown in the figure, the manifest contains a splice indicator, in the following form: schemeIdUri="urn:mpeg:dash:mpd-chaining:2016" value=http:// . . . /live2/manifest.mpd. This manifest chaining descriptor format is specified, for example, in Section 5.11 of the specification ISO/IEC 23009-1 $3^{rd}$ edition.

This splice indicator is immediately followed by an address storage indicator as proposed, such that both indicators (splice and address storage indicators) are treated in conjunction with one another when they are read by a device which performs a linear manifest readout. The exemplary address storage indicator illustrated in the figure takes the following non-limiting form: schemeIdUri="urn:mpeg:dash:origin-set:2019". The URN urn:mpeg:dash:origin-set:

2019 makes it possible to indicate, to the DASH client, that it has to store the URL address of the current manifest.

In the example illustrated, the two indicators are inserted into respective "SupplementalProperty" containers.

FIG. 6b illustrates an exemplary manifest in DASH format into which a return indicator has been inserted according to one particular embodiment of the proposed method.

In the example shown in the figure, the manifest contains a return indicator, in the following form: schemeIdUri="urn:mpeg:dash:origin-back:2019". Additionally, the manifest illustrated does not contain a cutaway indicator associated with the return indicator. In the example illustrated, the return indicator is inserted into a "SupplementalProperty" container. The URN urn:mpeg:dash:origin-back:2019 indicates, to the DASH client, that it has to return to the last stored manifest.

Of course, these examples are non-limiting, and in particular neither from among the address storage indicator and the return indicator proposed is limited to a particular format or syntax.

Figure 6C:
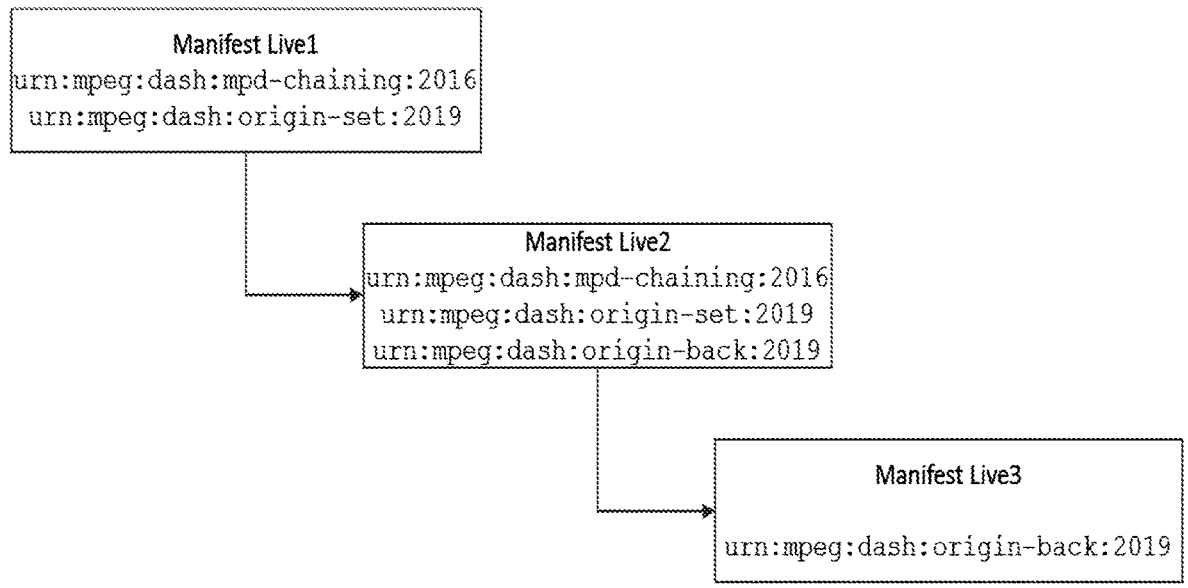
FIG. 6c illustrates an example of chaining sets of multimedia-content description metadata (or manifest) according to one or more embodiments.

FIG. 6c illustrates the use of the proposed indicators in the case of chaining three manifests.

A first manifest ("Manifest Live 1"), corresponding to a first content delivered in dynamic mode, comprises a first splice indicator and a first address storage indicator (in the example illustrated in the format proposed for the DASH standard). On reading these indicators, a device configured to implement the proposed method will be able to store an address of this first manifest (for example by stacking it in a memory managed in LIFO mode), and to splice reading to a second manifest ("Manifest Live 2—version 1") corresponding to a second content delivered in dynamic mode. The second manifest comprises a second splice indicator, a second address storage indicator and a first return indicator (in the example illustrated in the formats proposed for the DASH standard). On reading these indicators, the device will be able to store an address of this second manifest (for example by stacking it in the memory managed in LIFO mode), and to splice reading to a third manifest ("Manifest Live 3") corresponding to a third content content delivered in dynamic mode.

The return path from the third manifest to the first manifest is shown in dashed lines in the figure. The third manifest comprises a second return indicator (in the example illustrated in the format proposed for the DASH standard). On reading this second return indicator, the device will be able to retrieve the address of the second manifest, stored in a memory (for example by unstacking it from the memory managed in LIFO mode) and to splice reading to the second manifest. In one or more embodiments illustrated in the figure, the second manifest may have been updated in the meantime ("Manifest Live 2—version 2"), so as no longer to contain the second splice indicator or the second address storage indicator, but to keep the first return indicator. Specifically, in one or more embodiments, provision may be made to update a manifest to ensure that an address storage indicator is deleted in order to be replaced with a return indicator. On reading the first return indicator in the second manifest, the device will be able to retrieve the address of the first manifest, stored in a memory (for example by unstacking it from the memory managed in LIFO mode) and to splice reading to the first manifest, that is to say to return to the first content initially read.

In one or more embodiments, provision may be made that if a return indicator is present in a set of metadata, no address storage indicator or splice indicator indicating a splice to another set of metadata is present in the set of metadata. Specifically, it may be advantageous to ensure that an update of the set of metadata is performed so that an address storage indicator and/or a splice indicator indicating a splice to another set of metadata, which will have been used by a client having read these indicators in the set of metadata, are no longer present there, and are replaced there with a return indicator indicating a return to a previously used set of metadata, where applicable.

Figure 7:
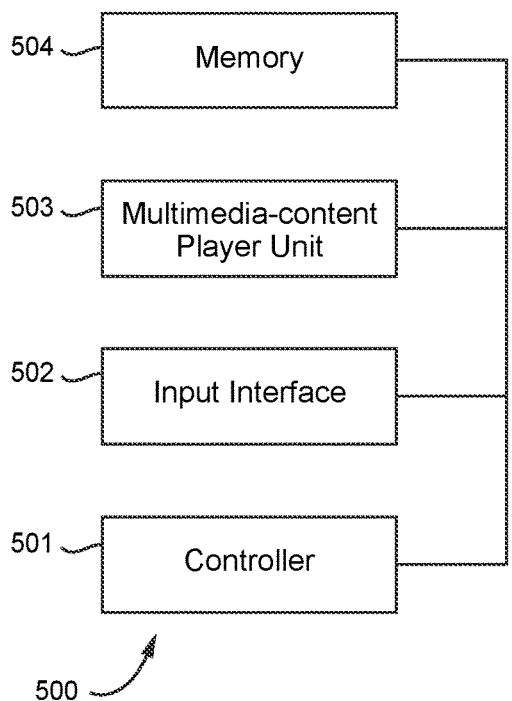
FIG. 7 illustrates an example of a device architecture for implementing the proposed method according to one or more embodiments.

FIG. 7 illustrates an example of an architecture of a device for playing multimedia contents for the implementation of the proposed method.

With reference to FIG. 7, the device 500 comprises a controller 501, operationally coupled to an input interface 502 and to a memory 504, which drives a multimedia-content player unit 503.

The input interface 502 is configured to receive, from a content server, data segments (audio and/or video segments) corresponding to multimedia contents delivered in dynamic mode, and sets of metadata corresponding to these contents.

The controller 501 is configured to drive the multimedia-content playback unit 503 to implement one or more embodiments of the proposed method.

The device 500 may be a computer, a computer network, an electronic component, or other apparatus comprising a processor operationally coupled to a memory, and, depending on the embodiment chosen, a data storage unit, and other associated hardware elements such as a network interface and a medium reader for reading a removable storage medium and writing to such medium (not shown in the figure). The removable storage medium may be, for example, a compact disk (CD), a digital video/versatile disk (DVD), a flash disk, a USB stick, etc. Depending on the embodiment, the memory, the data storage unit or the removable storage medium contains instructions that, when they are executed by the controller 501, cause this controller 501 to perform or control the input-interface portion 502, the multimedia-content-player portion 503 and/or the data-processing portion of the examples of implementation of the proposed method that are described herein. The controller 501 may be a component employing a processor or a computing unit to play multimedia contents according to the proposed method and to control the units 502, 503 and 504 of the device 500.

The device 500 may furthermore be implemented in the form of software, as described above, or in the form of hardware, such as an application-specific integrated circuit (ASIC), or in the form of a combination of hardware and software elements, such as for example a software program intended to be loaded and executed on an FPGA (field-programmable gate array) component.

INDUSTRIAL APPLICATION

Depending on the chosen embodiment, certain acts, actions, events or functions of each of the methods described in this document may be performed or take place in an order other than that in which they have been described, or may be added, merged or even not be performed or not take place, as the case may be. Furthermore, in some embodiments, certain acts, actions or events are performed or take place at the same time and not in succession.

Although described by way of a certain number of detailed exemplary embodiments, the proposed control method and the device for implementing an embodiment of the method comprise various variants, modifications and improvements that will appear obvious to anyone skilled in the art, and it will be understood that these various variants, modifications and improvements form part of the scope of the invention, such as defined by the following claims. In addition, various aspects and features described above may be implemented together, or separately, or indeed substituted for each other, and all of the various combinations and sub-combinations of the aspects and features form part of the scope of invention. Furthermore, it is possible for certain of the systems and pieces of equipment described above to not incorporate all of the modules and functions described with respect to the preferred embodiments.

The invention claimed is:

1. A method of managing multimedia contents, the method comprising:
   obtaining a first set of multimedia-content description metadata describing a first multimedia content delivered in dynamic mode;
   upon reading, from the first set of multimedia-content description metadata, a splice indicator indicating a splice to a second set of multimedia-content description metadata, reading, from the first set of multimedia-content description metadata, an address storage indicator; and
   storing, in a memory, an address of the first set of multimedia-content description metadata, based on the address storage indicator.

2. The method as claimed in claim 1, wherein the splice indicator indicating the splice from the first set of multimedia-content description metadata to the second set of multimedia-content description metadata comprises a chaining indicator indicating the chaining of sets of multimedia-content description metadata.

3. The method as claimed in claim 1, wherein the splice indicator indicating the splice from the first set of multimedia-content description metadata to the second set of multimedia-content description metadata comprises an address of the second set of multimedia-content description metadata.

4. The method as claimed in claim 1, wherein the stored address corresponds to an address from which the first set of multimedia-content description metadata was downloaded from a server.

5. The method as claimed in claim 4, further comprising: on reading, from the second set of multimedia-content description metadata, a return indicator, splicing reading from the second set of multimedia-content description metadata to the first set of multimedia-content description metadata using the address of the first set of multimedia-content description metadata.

6. The method as claimed in claim 1, wherein the first and second sets of multimedia-content description metadata are manifest in dynamic adaptive streaming over HTTP (DASH) format.

7. The method as claimed in claim 1, wherein the address storage indicator comprises a Uniform Resource Name, URN, descriptor of type: urn:mpeg:dash:origin-set or urn:mpeg:dash:origin-set:2019.

8. The method as claimed in claim 5, wherein the return indicator comprises a Uniform Resource Name, URN, descriptor of type: urn:mpeg:dash:origin-back or: urn:mpeg:dash:origin-back:2019.

9. A device for playing multimedia content, comprising:
   a processor; and
   a memory that is operationally coupled to the processor, wherein the processor is configured to implement a method of managing multimedia contents, the method comprising:
   obtaining a first set of multimedia-content description metadata describing a first multimedia content delivered in dynamic mode,
   upon reading, from the first set of multimedia-content description metadata, a splice indicator indicating a splice to a second set of multimedia-content description metadata, reading, from the first set of multimedia-content description metadata, an address storage indicator, and
   storing, in a memory, an address of the first set of multimedia-content description metadata, based on the address storage indicator.

10. The device as claimed in claim 9, wherein the splice indicator indicating the splice from the first set of multimedia-content description metadata to the second set of multimedia-content description metadata comprises a chaining indicator indicating the chaining of sets of multimedia-content description metadata.

11. The device as claimed in claim 9, wherein the splice indicator indicating the splice from the first set of multimedia-content description metadata to the second set of multimedia-content description metadata comprises an address of the second set of multimedia-content description metadata.

12. The device as claimed in claim 9, wherein the stored address corresponds to an address from which the first set of multimedia-content description metadata was downloaded from a server.

13. The device as claimed in claim 12, further comprising: on reading, from the second set of multimedia-content description metadata, a return indicator, splicing reading from the second set of multimedia-content description metadata to the first set of multimedia-content description metadata using the address of the first set of multimedia-content description metadata.

14. The device as claimed in claim 9, wherein the first and second sets of multimedia-content description metadata are manifest in dynamic adaptive streaming over HTTP (DASH) format.

15. The device as claimed in claim 9, wherein the address storage indicator comprises a Uniform Resource Name, URN, descriptor of type: urn:mpeg:dash:origin-set or urn:mpeg:dash:origin-set:2019.

16. A non-transitory computer-readable medium on which is stored a computer-executable program, including a data set representing one or more programs, said one or more programs including instructions that, on execution of said one or more programs by a computer including a processor operationally coupled to a memory and to an input/output interface module, cause the computer to manage multimedia contents according to a method of managing multimedia contents, the method comprising:
   obtaining a first set of multimedia-content description metadata describing a first multimedia content delivered in dynamic mode;
   upon reading, from the first set of multimedia-content description metadata, a splice indicator indicating a splice to a second set of multimedia-content description metadata, reading, from the first set of multimedia-content description metadata, an address storage indicator; and
   storing, in a memory, an address of the first set of multimedia-content description metadata, based on the address storage indicator.

17. The non-transitory computer-readable medium as claimed in claim 16, wherein the splice indicator indicating the splice from the first set of multimedia-content description metadata to the second set of multimedia-content description metadata comprises a chaining indicator indicating the chaining of sets of multimedia-content description metadata.

18. The non-transitory computer-readable medium as claimed in claim 16, wherein the splice indicator indicating the splice from the first set of multimedia-content description metadata to the second set of multimedia-content description metadata comprises an address of the second set of multimedia-content description metadata.

19. The non-transitory computer-readable medium as claimed in claim 16, wherein the stored address corresponds to an address from which the first set of multimedia-content description metadata was downloaded from a server.

20. The non-transitory computer-readable medium as claimed in claim 19, further comprising: on reading, from the second set of multimedia-content description metadata, a return indicator, splicing reading from the second set of multimedia-content description metadata to the first set of multimedia-content description metadata using the address of the first set of multimedia-content description metadata.

\* \* \* \* \*